United States Patent [19]

Marth et al.

[11] Patent Number: 4,991,303

[45] Date of Patent: Feb. 12, 1991

[54] LEVEL WITH MULTI-POSITION VIAL HOLDER

[75] Inventors: David S. Marth; John R. Bacher, both of Rockford, Ill.

[73] Assignee: Dasco Pro, Inc., Rockford, Ill.

[21] Appl. No.: 448,340

[22] Filed: Dec. 11, 1989

[51] Int. Cl.⁵ .................................................. G01C 9/24
[52] U.S. Cl. .......................................... 33/379; 33/381
[58] Field of Search ................................ 33/379–384, 33/387–390

[56] References Cited

U.S. PATENT DOCUMENTS

| | | | |
|---|---|---|---|
| 2,568,143 | 9/1951 | Casper | 33/390 |
| 2,634,509 | 4/1953 | Roberts | 33/381 |
| 2,810,206 | 10/1957 | Ziemann | 33/383 |
| 3,190,010 | 6/1965 | Johnson | 33/383 |
| 3,311,990 | 4/1967 | Wright | 33/379 |
| 3,593,428 | 7/1971 | Jacoff | 33/381 |
| 3,738,015 | 6/1973 | DeJong | 33/379 |
| 3,835,549 | 9/1974 | DeJong et al. | 33/379 |
| 4,011,660 | 3/1977 | Johnson | 33/379 |
| 4,124,940 | 11/1978 | Vaida | 33/379 |
| 4,407,075 | 10/1983 | MacDermott | 33/379 |
| 4,492,038 | 1/1985 | Mayes | 33/379 |
| 4,581,828 | 4/1986 | Handler et al. | 33/379 |
| 4,774,767 | 10/1988 | Scheyer | 33/384 |

Primary Examiner—William A. Cuchlinski, Jr.
Assistant Examiner—Alvin Wirthlin
Attorney, Agent, or Firm—Vernon J. Pillote

[57] ABSTRACT

A spirit level including a frame having parallel working surfaces and a web interconnecting the working surfaces. One or more vial openings of regular octagonal configuration are formed in the web. A vial case member having an octagonal wall is selectively positionable in the opening in the web with the vial extending either parallel to or perpendicular to or at an angle of forty-five degrees to the working surfaces. A second vial case member is disposed at the side of the web opposite the first mentioned case member and bonded to the octagonal wall on the case member to hold the case members in assembled relation on the web. A pair of case covers of like configuration are mounted at opposite sides of the web with hook portions on the cover members extending through openings in the web.

5 Claims, 2 Drawing Sheets

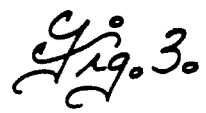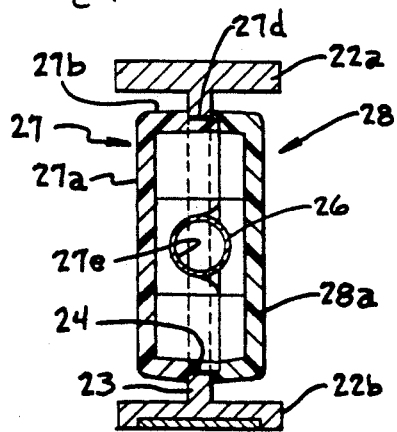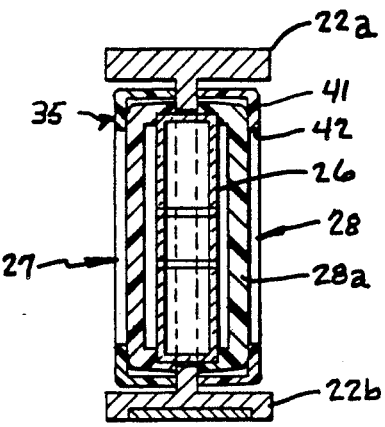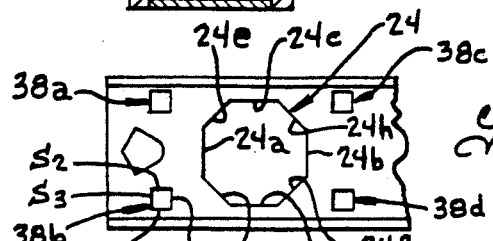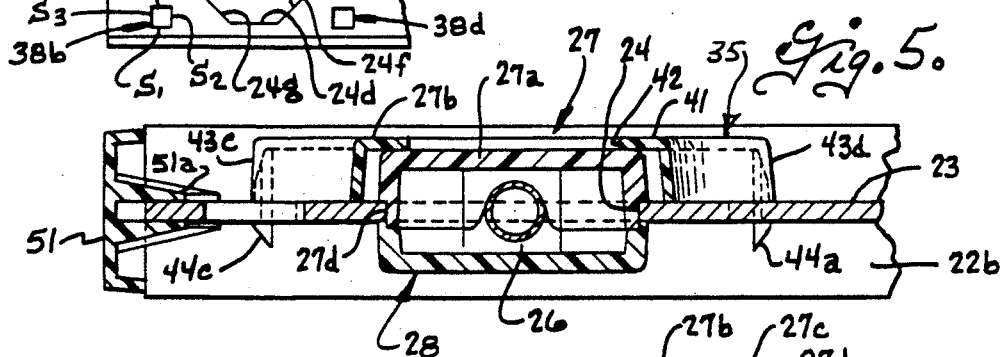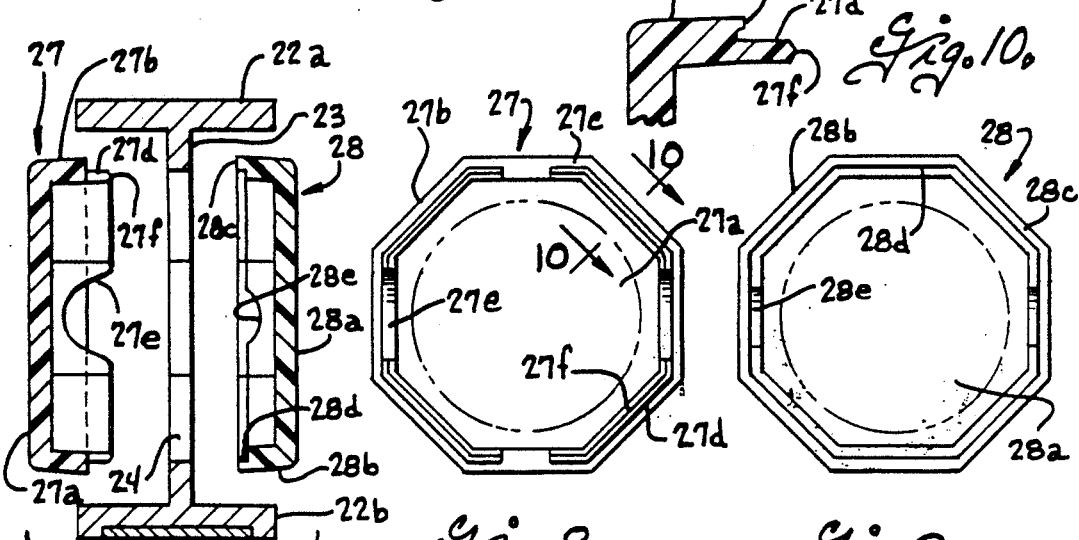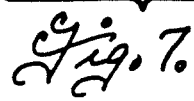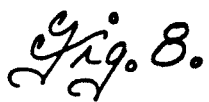

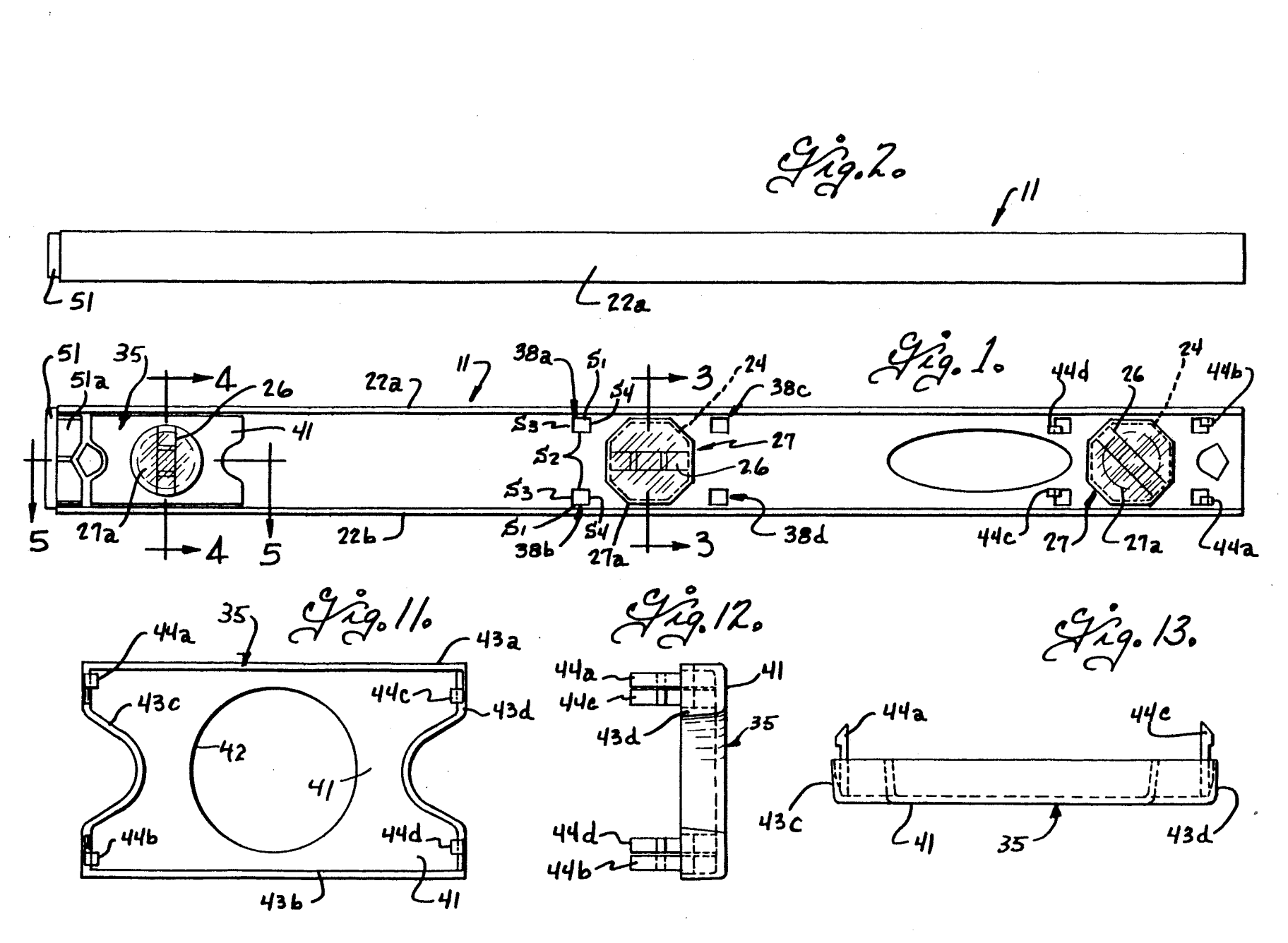

LEVEL WITH MULTI-POSITION VIAL HOLDER

BACKGROUND OF THE INVENTION

Spirit levels have heretofore been made with various different arrangements for mounting the level vial on the web portion of an I-shaped level frame and for orienting the level vial relative to the working surfaces of the frame. In some prior levels such as disclosed in U.S. Pat. Nos. 3,311,990; 3,738,015; 3,835,549; and 4,407,075, the level vials are mounted in diametrically opposed notches formed in the periphery of a vial opening in the frame, and vial case members are mounted on opposite sides of the web to retain the vials in the notches. The diametrically opposed notches must be precision formed to ensure that the vial is accurately positioned with respect to the working surfaces of the level body and, when it is desired to make a level in which level vials are mounted at several different angles with respect to the working surface, it is necessary to provide a plurality of pairs of such diametrically opposed notches. In some other prior levels such as disclosed in U.S. Pat. Nos. 2,810,206; 3,190,010; 3,593,428; 4,011,660 and 4,492,038, the level vials are mounted on or between a pair of opposed vial case members and the vial case members are attached to opposite sides of the web of the level frame by bolts or screws. Such arrangements usually require some angular adjustment of one or both case members in order to properly position the level vial with respect to the working surfaces of the frame, and this increases the cost of manufacture. In U.S. Pat. No. 4,124,940, one vial case member is provided with ears that extend into notches in the web of a level frame and the level vial is mounted on a second case member that is angularly adjustable relative to the first case member, to enable angular positioning of the vial with respect to the working surfaces of the level, and the case members are thereafter bonded together to hold the level vial in its adjusted position. In U.S. Pat. No. 4,581,828, the web is formed with a square opening and the level vial is mounted on one vial case having four pairs of tabs for engaging the opening in the web at the corners, and four camming posts are provided on the other vial holder to cam the tabs outwardly into engagement with the opening in the web, when the vial case members are drawn together against opposite sides of the web by screws that interconnect the case members.

SUMMARY OF THE INVENTION

It is an object of the present invention to provide a spirit level having an improved arrangement for mounting a level vial on the frame of a level with the level vials selectively positioned either parallel to the working surfaces or perpendicular to the working surfaces or at an angle of forty-five degrees to the working surfaces, and in which the various parts may be economically formed and assembled.

Accordingly, the present invention provides a spirit level of the type having a frame with parallel working surfaces and a web interconnecting the working surfaces. The web is formed with at least one vial opening of regular octagon configuration, with one pair of opposed parallel edges extending perpendicular to the working surfaces; a second pair of opposed parallel edges extending parallel to the working surfaces; and third and fourth pairs of opposed parallel edges extending at an angle of forty-five degrees to the working surfaces. A pair of vial case members are disposed at opposite sides of the web and have a wall of octagonal configuration extending therebetween and dimensioned to be closely received in the vial opening, and the level vial is mounted on the case members with the vial extending perpendicular to one pair of the opposed sides of the wall means. The vial case members are selectively positioned in the vial opening with said one pair of opposed sides of the wall means contiguous to the first or the second or the third or the fourth pairs of opposed parallel edges of the vial openings, to support the level vial on the frame with the level vial extending either parallel or perpendicular or at an angle of forty-five degrees to the working surfaces.

The octagonal wall is advantageously formed on the vial case member having vial positioning means so that the level vial can be selectively positioned to extend perpendicular to or parallel to or at an angle of forty-five degrees to the working surfaces when that vial case member is mounted in the vial opening in the frame. A second of the vial case members is formed with a recess for receiving a forward end portion of the wall on the first case member to angularly position the second case member relative to the first case member. The case members are joined together by a bond between the forward end portion of the wall of the first case member and the recessed area on the second case member.

BRIEF DESCRIPTION OF THE DRAWINGS

FIG. 1 is a side view of a spirit level embodying the present invention, and with some parts removed to illustrate details of construction;

FIG. 2 is a top plan view of the level of FIG. 1;

FIG. 3 is a transverse sectional view taken on the plane 3—3 of FIG. 1;

FIG. 4 is a transverse sectional view taken on the plane 4—4 of FIG. 1;

FIG. 5 is a fragmentary longitudinal sectional view taken on the plane 5—5 of FIG. 1;

FIG. 6 is a fragmentary side view of a portion of the level frame;

FIG. 7 is an exploded view illustrating assembly of the vial holders on the frame;

FIG. 8 is an elevational view illustrating the inner side of one of the vial cases;

FIG. 9 is an elevational view illustrating the inner side of the other of the vial cases;

FIG. 10 is a fragmentary sectional view taken on the plane 10—10 of FIG. 8 and illustrating parts on a larger scale;

FIG. 11 is an elevational view illustrating the inner side of a cover member;

FIG. 12 is an end view of the cover member of FIG. 11; and

FIG. 13 is an edge view of the cover member of FIG. 11.

DETAILED DESCRIPTION OF A PREFERRED EMBODIMENT OF THE INVENTION

As shown in FIG. 1, the level has a rigid frame preferably, of a metal such as aluminum and having parallel flanges 22a and 22b (FIGS. 3 and 7) defining working surfaces, and a web 23 interconnecting flanges 22a and 22b. In accordance with the present invention, the web 23 of the frame is formed with one or more vial openings 24 of regular octagon configuration. As best shown in FIG. 6, the vial opening 24 has one pair of opposed parallel edges 24a, 24b extending perpendicular to the working surfaces defined by the flanges 22a, 22b; a second pair of opposed parallel edges 24c, 24d extending parallel to the working surfaces; a third pair of opposed parallel edges 24e and 24f extending at an angle of forty-five degrees to the working surfaces and a fourth pair of opposed parallel edges 24g and 24h extending at an angle of forty-five degrees to the working surfaces. The octagonal vial opening 24 is preferably located with its geometric center substantially medially between the flanges 22a and 22b with the edges 24c and 24d spaced inwardly from the flanges.

A level vial 26 is mounted in the vial opening 24 by first and second vial case members 27 and 28 (see FIGS. 1, 8 and 9) formed of a rigid transparent plastic such as polycarbonate. The vial case member 27 has a window area 27a and a marginal rim 27b with a shoulder 27c on the rim adapted to engage one side of the web 23, outwardly of the vial opening. The rim preferably has an octagonal configuration as best shown in FIGS. 1 and 8 and integral wall means of octagonal configuration 27d are formed on the rim inwardly of the shoulder 27c. The octagonal wall means 27d is dimensioned to be closely received in the octagonal vial opening 24 and the wall means projects from the shoulder 27d a distance slightly greater than the thickness of the web 23, for reasons which will become apparent hereinafter. The rim 27b and wall means 27d have a vial receiving notch or recess 27e formed in one pair of opposed sides of the wall means to receive end portions of the level vial 26 and to support the level vial with the axis of the vial extending perpendicular to one pair of opposed sides of the octagonal wall means. The vial case 27 is adapted to be selectively positioned at the vial opening with the level vial extending either perpendicular to the flanges 22a, 22b as shown at the left hand side of the level in FIG. 1 or parallel to the flanges as shown at the center of the level in FIG. 1, or at an angle of forty-five degrees to the flanges as shown at the right hand side in FIG. 1. The vial receiving notches 27e position the level vial 26 on the case member 27 and the octagonal wall means 27d on the case is dimensioned to be closely received in the octagonal vial opening so that the vial case 27 accurately positions the level vial at the selected angular relation to the flanges, when the vial case 27 is positioned in the octagonal vial opening.

As best shown in FIG. 9, the second vial case 28 has a view window 28a and a marginal rim 28b of octagonal configuration and defining a shoulder 28c at the distal end of the rim adapted to engage a side of the web 23. The rim 28b has a recess 28d of octagonal configuration shaped to receive the projecting forward end portion of the wall means 27d. The rim 28b also has notches or recesses 28e in the rim portion 28b at diametrically opposed sides for receiving end portions of the level vial 26, when the second case member is assembled on the first case member.

The case members are retained in positions at opposite sides of the web of the level frame by bonding the forward end portion of the wall means 27d on the first case member 27 to the octagonal recess area 28d on the second case member 28 (see FIG. 7). The case members may be bonded together by an adhesive but are preferably bonded together by ultrasonic bonding. In order to facilitate ultrasonic bonding of the case members, the forward edge of the octagonal wall means 27d is provided with a narrow ridge or rib 27f as best shown in FIGS. 7-10, to direct or concentrate the sonic energy during sonic bonding. As will be readily understood, the projection of the wall means 28d, from the shoulder 28c is made slightly greater than the sum of the thickness of the web 23 and the depth of the recess 28d in the rim of the case member 28 so that the rib or ridge 27f will contact the base of the recess 28d during sonic bonding. When bonded together, the shoulders 27c and 28c of the case members 27 and 28, respectively are disposed in firm abutting engagement with the opposite sides of the web 23 and firmly retain the vial in position.

Vial case covers 35 are advantageously provided for protectively shielding the vial cases without obstructing the view opening therein. A pair of vial case covers are provided for each vial case assembly, one at each side of the web 23, and the vial case covers 35 are constructed and arranged so that the covers of each pair are of like configuration and the same numerals are used to designate the parts on both case covers. As best shown in FIGS. 1 and 6, the web of the frame has four auxiliary openings 38a–38d disposed outwardly of the vial opening in a rectangular array, with the geometric center of the array disposed at the geometric center of the associated octagonal vial opening 24. The auxiliary openings preferably have a rectangular configuration with outer and inner longitudinal edges S1 and S2 extending parallel to the flanges 22a, 22b and outer and inner transverse edges S3 and S4 extending perpendicular to the flanges of the level body. The vial case covers 35 are formed of an impact resistant plastic such as high density polypropylene, and as shown in FIG. 11, each cover includes a face portion 41 having a view opening 42 therein adapted to register with the window of an associated one of the vial case members, and relatively parallel side flanges 43a, 43b and end flanges 43c and 43d that extend between the side flanges at a location spaced from the view opening 42. The side and end flanges on the cover members form a marginal rim, the distal edge of which is adapted to engage a side of the web 23, and a first pair of hook members 44a, 44b are formed integrally with the cover member adjacent one end and a second pair of hook members 44c, 44d are formed integrally with the cover member adjacent the other end. The hook members are arranged to extend through the auxiliary openings in the web of the frame so that the four hook members on the cover members at both sides of the web can be mounted in the four auxiliary openings. As best shown in FIGS. 1, 11 and 12, the pair of hook members 44a, 44b at one end of the cover 35 are spaced apart a relatively greater distance than the pair of hook members 44c, 44d at the other end of the cover member. Hook members 44a and 44b are spaced apart a distance so as to extend alongside the outer longitudinal edges S1 of the auxiliary openings and hook members 44c and 44d are spaced apart a distance to extend alongside the inner longitudinal edges S2 of the auxiliary openings. With this arrangement, the cover member at one side of the web can be mounted with the hook members 44a, 44b extending into one of the pairs of auxiliary openings such as 38a, 38b while the hook members 44c and 44d extend through the other pair of auxiliary openings 38c and 38d. A cover member of like configuration can be positioned at the opposite side of the web and with the members 44c, 44d extending through the opening 38a, 38b while the other members 44a, 44b extend through openings 38c, 38d. As will be seen, the hook members on the cover member are shaped to engage one of the transverse edges of the auxiliary openings such as the outer transverse edges S3 that extend perpendicular to the flanges and to snap into locking position as shown in FIG. 5 when the cover member is in position. When cover members are assembled at opposite sides of the web, the hook members on one cover member extend alongside hook members on the relatively opposite end of the other cover member. The end flanges 43c and 43d on the cover members are constructed and arranged to provide clearance for the distal ends of the hook members on a cover member mounted on the opposite side of the web.

Protective end caps 51 preferably of an impact resistant plastic material, are preferably provided at the ends of the level frame. As shown, the end caps have spaced flanges 51a adapted to straddle the web portion of the frame between the flanges 22a, 22b. The end caps may be secured to the ends of the frame in any suitable manner as by adhesive, fasteners or the like.

From the foregoing it is believed the construction of the level will be readily understood. The octagonal vial openings 24 and auxiliary openings 38a–38d can be punched in the web of the frame. The vial case member 27 which retains the level vial 26 is selectively positionable in the vial opening with the level vial extending either parallel to the flanges or perpendicular to the flanges or at an angle of forty-five degrees to the flanges. The other vial case member 28 is then positioned at the other side of the web of the frame and with the forward end portion of the octagonal wall on the vial case member 27 extending into the octagonal recess 28d in the case member 28. The vial case members are then bonded together, preferably by sonic welding. The case cover members 35 are thereafter mounted at opposite sides of the web with one case member reversed endwise with relation to the other case member.

The embodiments of the invention in which an exclusive property or privilege is claimed are defined as follows:

1. A spirit level comprising, a frame having parallel working surfaces and a web interconnecting the working surfaces, the web having first and second sides and at least one vial opening therethrough of regular octagon configuration, the vial opening having a first pair of opposed parallel edges extending perpendicular to the working surfaces; a second pair of opposed parallel edges extending parallel to the working surfaces; and third and fourth pairs of opposed parallel edges extending at an angle of forty-five degrees to the working surfaces, first and second vial case members each having a window area and a marginal rim, the marginal rim on the first vial case member engaging the first side of the web outwardly of the opening and the marginal rim on the second vial case member engaging the second side of the web outwardly of the vial opening, wall means of octagonal configuration extending between and rigidly interconnecting the vial case members closely received in the vial opening, an elongated level vial, the vial case members having vial retainer means for engaging and holding the level vial with the vial extending perpendicular to one pair of opposed sides of the wall means, the vial case members being selectively positionable in the vial opening in web with said one pair of opposed sides of the wall means contiguous to either said first or said second, or said third pairs of opposed parallel edges of the vial opening to support the level vial on the frame with the level vial extending either parallel or perpendicular or at an angle of forty five degrees to the working surfaces, and means retaining the vial case members in engagement with opposite side sides of the web.

2. A spirit level according to claim 1 wherein said web has four auxiliary openings therethrough disposed outwardly of the vial opening in a rectangular array, the openings each having first and second edges respectively spaced first and second distances from a reference line extending parallel to the working surfaces and through the geometric center of the vial opening, a pair of cover members of like configuration disposed at opposite sides of the web and each having a central view opening and a marginal rim and two pairs of hook members integral therewith, one of the pairs of hook members on one cover member extending through one pair of the auxiliary openings alongside the first edges thereof and the other pair of hook members on said one cover member extending through the other pair of the auxiliary openings alongside the second edges thereof, one pair of hook members on the other cover member extending through said one pair of auxiliary openings alongside the second edges thereof and the other pair of hook members on said other cover member extending through said other pair of auxiliary openings alongside said first edges thereof.

3. A spirit level comprising, a frame having parallel working surfaces and a web interconnecting the working surfaces, the web having at least one vial opening therethrough of regular octagon configuration, the vial opening having a first pair of opposed parallel edges extending perpendicular to the working surfaces, a second pair of opposed parallel edges extending parallel to the working surfaces, and third and fourth pairs of opposed parallel edges extending at an angle of forty-five degrees to the working surfaces, a first vial case member having a window area and a marginal rim defining a shoulder engageable with one side of the web outwardly of the vial opening, the first vial case member having wall means of octagonal configuration on the marginal rim inwardly of the shoulder thereon, an elongated level vial, the first vial case member having vial retaining means for supporting the level vial with the vial extending perpendicular to one pair of opposed sides of the wall means, the first vial case member being selectively positionable in the vial opening in the web with said one pair of opposed sides of the wall means contiguous to either said first or said second or said third or said fourth pairs of opposed parallel edges of the vial opening to position the level vial on the frame with the level vial extending either parallel or perpendicular or at an angle of forty-five degrees to the working surfaces, the wall means on the first vial case member extending contiguous to the edges of the vial opening and having a forward end portion projecting from the side of the web opposite the side engaged by the shoulder of the first case member, a second vial case member having a window area and a marginal rim defining a shoulder engageable with a side of the web opposite the side engaged by the first vial case member, the second vial case member having a recess in the marginal rim inwardly of the shoulder thereon for receiving the forward end portion of the wall means on the first vial case member, and means for retaining the vial case members together.

4. A spirit level according to claim 3 wherein last mentioned means comprises a bond between the forward end portion of the wall means on the first case member and the recess on the second case member.

5. A spirit level according to claim 4 wherein said web has two pairs of auxiliary openings therethrough disposed outwardly of the vial opening in a rectangular array, the openings each having first and second edges respectively spaced first and second distances from a reference line extending parallel to the working surfaces and through the geometric center of the vial opening, a pair of cover members of like configuration disposed at opposite sides of the web and each having a central view opening and a marginal rim and two pairs of hook members integral therewith, one of the pairs of hook members on one cover member extending through one pair of the auxiliary opening alongside the first edges thereof and the other pair of hook members on said one cover member extending through the other pair of the auxiliary openings alongside the second edges thereof, one pair of hook members on the other cover member, extending through said one pair of auxiliary openings alongside the second edges thereof and the other pair of hook members on said other cover member extending through said other pair of auxiliary openings alongside said first edges thereof.

* * * * *